United States Patent Office 3,186,944
Patented June 1, 1965

3,186,944
GREASE COMPOSITIONS
John L. Dreher, Berkeley, Calif., assignor to California Research Corporation, San Francisco, Calif., a corporation of Delaware
No Drawing. Filed Apr. 24, 1963, Ser. No. 275,211
9 Claims. (Cl. 252—18)

This application is a continuation-in-part of patent application Serial No. 771,186, filed November 3, 1958, now abandoned. This invention is directed to hydrous lubricating grease compositions, more particularly to hydrous grease compositions wherein oils of lubricating viscosity are thickened to grease consistency by the use of certain particular ratios of calcium 12-hydroxy stearate, calcium acetate, calcium carbonate and calcium hydroxide in combination.

During the past few years, there has been a noticeable trend in the grease art to blend grease compositions which can be used for more than one purpose; that is, the usefulness of grease compositions has been extended. These multi-purpose lubricants are rapidly displacing special purpose grease compositions throughout all fields where greases are used, particularly in the field of industrial greases. The grease compositions of the prior art, in particular those described in the patents noted hereinbelow, are useful as multi-purpose greases to a limited degree only, mainly because prior art greases lack high film strength. Furthermore, it is known that the surfaces of such grease compositions of the prior art crust upon ageing, making the grease undesirable for use. Contrary thereto, no crust forms on the surfaces of the grease compositions described herein, nor do the grease compositions harden upon ageing.

The grease art describes well the use of calcium soaps of fatty acids (e.g., calcium 12-hydroxy stearate) as grease thickening agents, and the use of metal salts of low molecular weight fatty acids (e.g., calcium acetate) as modifying agents for such grease compositions (e.g., calcium acetate as a modifying agent in grease compositions thickened with calcium 12-hydroxy stearate).

U.S. Patent No. 2,607,735 describes anhydrous grease compositions containing the combination of calcium 12-hydroxy stearate and calcium acetate. This patent emphasizes that the calcium greases described therein which are stable at high temperatures are anhydrous.

U.S. Patent No. 2,842,495 teaches that calcium acetate-calcium fatty acid soap grease compositions of high film strength are obtained by using large excesses of calcium acetate; that is, the calcium acetate/calcium fatty acid soap mol ratios must be at least 7 to 1, even as high as 40 to 1. Patentees point out that prior to their invention, greases having salt/soap mol ratios less than that noted had low film strength.

U.S. Patent No. 2,596,556 teaches that urea can be used as a complexing agent in the preparation of water resistant, high temperature grease compositions, emphasizing that such greases must be neutral.

In contrast to the compositions described hereinabove, applicant's greases are hydrous greases, that is, the greases described hereinbelow have at least 0.1%, and preferably 0.5% by weight of water from the standpoint of load-bearing qualities; have calcium acetate-calcium hydroxy-stearate mol ratios less than 5 to 1; and are basic. In the preparation of the grease compositions defined herein, it is necessary that the amount of basic compound is in excess of that sufficient to neutralize any saponifiable or salt-forming components.

Because of the uniqueness of the grease compositions defined herein, smaller amounts of the conventional grease thickening agents need be used to obtain greases having consistencies necessary for multi-purpose greases.

Such grease compositions prepared according to the prior art, although they can be characterized as water resistant, high temperature greases, cannot be used wherein it is essential to have high film strength for proper lubrication of frictional surfaces. That is, grease compositions of high film strength are not obtained in high yield merely by the use of calcium acetate-calcium hydroxy stearate.

It is a primary object of this invention to set forth grease compositions having exceptionally high film strengths and using low acetate-hydroxy stearate ratios. Such products may be used as multi-purpose grease compositions, displacing numerous greases currently necessary to lubricate frictional surfaces.

In accordance with this invention, it has been discovered that hydrous grease compositions having multi-purpose characteristics are obtained by incorporating in oil of lubricating viscosity a calcium soap of 12-hydroxy stearic acid (or its equivalent) in amounts sufficient to thicken said oil to the consistency of a grease; calcium acetate in amount of from 2 mols to 5 mols for each mol of said calcium soap of 12-hydroxy stearic acid, excess base expressed as calcium hydroxide, at least 0.5% water, and calcium carbonate in amounts sufficient to impart improved consistency to said grease composition, which calcium carbonate is obtained by reacting urea with calcium hydroxide.

Although the grease compositions have amounts of base (i.e., calcium hydroxide) in excess of that necessary for the neutralization of the acidic components used in the preparation of the grease, such base need not be present in the finished grease as calcium hydroxide. Although this excess base is expressed herein as free calcium hydroxide, such base may form basic salts, for example, basic calcium carbonate, basic calcium acetate, and basic calcium 12-hydroxy stearate. However, no theory is postulated herein to explain the possibility of basic salt formation.

The grease compositions described in this invention are water resistant, have high film strength, have improved work stability, and have excellent high temperature characteristics. Although the grease compositions formed according to this invention have ASTM dropping points in the range of 500 to 580° F., the actual melting points may be as high as 700° F. and higher. Such greases can be used in steel mills, automobile and truck chassis, rock crushers, electric powered excavation equipment, shaking screens, cement plants, railroad service (particularly journal bearings), in aviation equipment, etc.

As used herein, the term "calcium soap of 12-hydroxy stearic acid" also includes the calcium soap of hydrogenated ricinoleic acid.

The calcium 12-hydroxy stearate is used in amounts sufficient to thicken oils of lubricating viscosity to the consistency of a grease; that is, in amounts ranging from 5% to 25%, by weight, preferably 7% to 12%, by weight.

The calcium acetate is used in amounts of 4% to 25%, by weight, 6% to 12% by weight being preferred.

For the desired characteristics of the final grease composition, it is essential that the above-named components be present in the grease composition in certain proportions with respect to each other. For example, it is essential that the mol ratio of the calcium acetate to the calcium 12-hydroxy stearate have values less than 5; ranging preferably from 2 to 5; that is, that the calcium acetate/calcium 12-hydroxy stearate mol ratio be from 2:1 to 5:1.

The calcium carbonate present as a component in the final grease composition (which component increases the consistency of the grease) is obtained by the reaction of urea with calcium hydroxide during the preparation of the grease. Based on the finished grease, urea is used in amounts of about 1.0% to about 6.0% by weight. Since 1 mol of urea is believed to react with 1 mol of calcium hydroxide to form the calcium carbonate, the finished grease composition thus prepared has from about 1.7% to about 10.0%, by weight, of calcium carbonate; preferably about 2.0% to about 6.0% by weight.

It is essential that the calcium hydroxide be used in an amount in excess of that necessary to form calcium 12-hydroxy stearate from the 12-hydroxy stearic acid, calcium acetate from the acetic acid, and calcium carbonate from reaction with urea. The excess calcium hydroxide is such that the finished grease has from 1% to 8%, by weight, of excess base expressed as calcium hydroxide.

In the preparation of the grease described in U.S. Patent No. 2,595,556 noted hereinabove, wherein urea is a complexing agent, there can be an excess of 0.1 to 3 equivalents of calcium hydroxide per equivalent of calcium 12-hydroxy stearate. However, in the preparation of the grease composition described herein, it is essential to use from 6 to 18 equivalents of calcium hydroxide per equivalent of calcium 12-hydroxy stearate.

The finished grease composition contains at least 0.5% of water; that is, the finished grease is a hydrous grease composition containing from 0.5% to 3.0%, by weight, of water.

Lubricating oils which are suitable as base oils for the grease compositions of this invention include a wide variety of oils, such as mineral oils, as exemplified by the naphthenic base, paraffin base, and mixed base oils derived from petroleum, including lubricating oils derived from coal products, etc.

The grease compositions of the invention can be prepared by blending the 12-hydroxy stearic acid (or the alkyl ester thereof) with an oil, and heating the blend sufficiently to disperse the acid in the oil. A large excess of calcium hydroxide (i.e., from 6 to 18 equivalents of 12-hydroxy stearic acid) is then added and the whole mixture stirred to obtain a uniform dispersion of the resulting soap in the oil. The mixture is then heated to a temperature of about 180° F., after which the acetic acid is added slowly. The whole mixture is stirred for a period of time sufficient to obtain a smooth dispersion, after which the urea is added, and the mixture is heated to a temperature of about 320° F. under a pressure of 70 to 95 p.s.i. This pressure range, which is not critical, is maintained by bleeding into the atmosphere the ammonia formed during the conversion of the urea. The mixture is then heated to about 320° F. at atmospheric pressure for the purpose of completing the reaction.

The examples hereinbelow illustrate the preparation of compositions of this invention.

EXAMPLE I

A mixture of 7.9% by weight, of 12-hydroxy stearic acid and about 45%, by weight, of a California solvent refined paraffinic base oil having a viscosity of 480 SSU at 100° F. was heated to a temperature of 130° F. 15% of hydrated lime was then added and the mixture was agitated at 130° F. for a period of time sufficient to form a uniform blend. The whole mixture was heated to 180° F. and maintained at that temperature for a period of 30 minutes, after which 8%, by weight, of acetic acid was added slowly during a period of 30 to 45 minutes. 10% of the same oil described hereinabove was then added, after which there was added 2.2% by weight, of urea, and the mixture was heated to 320° F. at a pressure of 70–90 p.s.i. for a period of one hour. The whole mixture was then heated at 330° F. at atmospheric pressure.

As exemplified hereinbelow in Example II, the grease may also be prepared by the use of an ester of 12-hydroxy stearic acid.

EXAMPLE II

A mixture of 7.9% of methyl 12-hydroxy stearate and 45% of a California solvent refined paraffinic base oil having a viscosity of 480 SSU at 100° F. was blended at room temperature, then heated to a temperature ranging from 180° F. to 190° F. The mixture was then cooled to a temperature of 180° F. to 190° F. for a time sufficient to disperse the methyl 12-hydroxy stearate in the oil. The mixture was then cooled to 130° F. followed by addition of 15% by weight of calcium hydroxide, after which the mixture was agitated at 130° F. to obtain a uniform dispersion in the oil. There was then added 0.1% sodium hydroxide in 1% water, and the whole mixture was heated to 180°–200° F. for a period of 30 minutes, after which 8.0% of glacial acetic acid was added over a period of time of about 30–45 minutes. At this point there may be added 10%, by weight, of the lubricating oil described hereinabove. 2.2% by weight, of urea was then added at 180° F., followed by sealing the mixture from the atmosphere and heating to 320° F. at 70–90 p.s.i. for a period of about one hour. The mixture was then vented to the atmosphere and heated at 330° F. for a period of one hour at atmospheric pressure. The balance of the oil was then added to make a total of 100%.

EXAMPLE III

A mixture of 2,370 grams of methyl, 12-hydroxy stearate and 5,000 grams of a California solvent refined paraffin base oil having a viscosity of 489 SSU at 100° F. was heated to 180° F. with agitation in an open grease mixer until a uniform blend was obtained. 8,000 grams grams of the above-identified oil was added, cooling the mixture to 120° F. 4,500 grams of calcium hydroxide was added with agitation until a uniform blend was obtained. 2,400 grams of glacial acetic acid was added slowly, and the temperature was raised to 180° F. After 660 grams of urea had been added, the mixer was closed, and the temperature was raised to 330° F. The pressure was maintained at 70 to 90 p.s.i. at 330° F. for approximately one hour. The pressure was reduced to atmospheric pressure; the mixer opened, and 7,770 grams of the same oil, 210 grams of an oxidation inhibitor, and 90 grams of a rust inhibitor were added.

Table I hereinbelow describes greases prepared as in Examples I, II and III hereinabove.

*Table I*

| Grease No. | 1 | 2 | 3 | 4 | 5 | 6 | 7 | 8 |
|---|---|---|---|---|---|---|---|---|
| Components used in grease preparation: | | | | | | | | |
| 1. 12-hydroxy stearic acid, grams | 2,370 | 2,370 | 2,360 | | 2,370 | 2,370 | 2,370 | 1,350 |
| 2. Hydrogenated fish oils, grams | | | | 2,370 | | | | |
| 3. Glacial acetic acid, grams | 2,400 | 2,400 | 2,400 | 2,400 | 2,400 | 2,400 | 2,400 | 3,600 |
| 4. Urea, grams | 330 | 660 | 2,100 | 660 | 660 | | (1) | 660 |
| 5. Hydrated lime, grams | 4,500 | 4,500 | 6,308 | 4,500 | 4,500 | 4,500 | 4,500 | 5,640 |
| 6. Base oil, grams | 17,000 | 20,080 | 33,300 | 17,370 | 18,770 | 18,630 | 16,930 | 20,450 |
| 7. Oxidation inhibitor, grams | | | | 210 | 210 | 210 | 210 | 210 |
| 8. Rust inhibitor, grams | | | | 90 | 90 | | 90 | 90 |
| Mol ratio (acetate/stearate) | 5 | 5 | 5 | 5 | 5 | 5 | 5 | 13 |

[1] $CaCO_3$ obtained by adding $CO_2$ during pressure step of grease preparation. $CO_2$ pressure maintained at 80–90 p.s.i.

Table II hereinbelow presents data illustrating characteristics of grease compositions of this invention. The tests are described in "Journal of the Institute of Petroleum," Volume 32, April 1946.

Table II

| Tests | Ex. III above | Grease No. Corresponding to grease No. of Table I | | | | | | | |
|---|---|---|---|---|---|---|---|---|---|
| | | 1 | 2 | 3 | 4 | 5 | 6 | 7 | 8 |
| 1. Timken, pounds (pass/fail) | 45/50 | 45/50 | 50/55 | 35/45 | —/40 | 45/55 | —/35 | 55/— | 50/60 |
| 2. Mean Hertz load, kg | 61 | | | | | | | | |
| 3. 4-ball wear scar, mm. (steel on steel) | 0.26 | | | | | | | | |
| 4. Falex, mgs. (steel on steel) | 8 | | | | | | | | |
| 5. Almen, mgs. (Steel on brass) | 0.8 | | | | | | | | |
| 6. ASTM dropping point, °F | 555 | 530 | 560 | 530 | 560 | 559 | 526 | | |
| 7. Bearing life: | | | | | | | | | |
| 250° F | [1] 1,900 | | | | | | | | |
| 300° F | [2] 770 | | | | | | | | |
| 8. ASTM penetration: | | | | | | | | | |
| a. $P_0$ | 295 | 288 | 310 | 351 | 253 | 298 | 322 | 283 | 256 |
| b. $P_{60}$ | 330 | 340 | 340 | 363 | 317 | 326 | 330 | 335 | 324 |
| c. $P_{100,000}$ | 355 | | | | | | | | |
| 9. Water resistance, percent loss | 0.7 | | | | | | | | |
| 10. Water stability (percent change in consistency) | −1.0 | | | | | | | | |
| 11. Water content | 1.5 | 1.6 | 1.6 | | | 1.7 | | 1.7 | |
| 12. Roll test, percent ΔP (4 hrs.) | −3.3 | | | | | | | | |

[1] Average of 4 runs.  [2] Average of 5 runs.

tests used to evaluate the greases are described as follows:

The "Bearing Life" for a particular grease composition was determined by the following test procedure which is known as the Navy high speed bearing test, also known as Federal Standard No. 791, Test Method No. 331. In the test, a ball bearing packed with a grease was operated at 10,000 r.p.m. continuously for 22 hours at the noted temperature. The apparatus was then cooled to room temperature during a period of two hours. This procedure of operation at 10,000 r.p.m. at the noted temperature and cooling was repeated until there was bearing failure. The number of hours is the number of hours prior to bearing failure.

The Roll Test was run by placing 75 grams of grease in a Roll Test apparatus which is described in military specification MIL-G-10924A. However, whereas the MIL-G-10924A test specifies 10 r.p.m. for the apparatus, the data herein were obtained with an apparatus operating at 175 r.p.m. Any grease remaining as a grease for a period of at least 4 hours in this test, is considered to have an excellent work stability.

The water stability test measured the percentage change in consistency of the grease composition by the addition of water. This water stability test is the Miltary specification test MIL-G-19924A. This test was run by mixing the grease with 10%, by weight, of water in a grease, and the grease-water mixture was worked for 100,000 strokes in an ASTM worker at 77° F., after which the change in consistency was determined.

The water resistance test (MIL-L-3545) was run by packing a ball bearing with a weighed amount of grease. The bearing was then rotated with water impinging on the bearing plate. The amount of grease washed out of the bearing in one hour was measured.

In the Timken Test, a hardened steel ring was rotated against a steel test block while the grease composition being tested was fed to the point of contact of the two test members. The feed of the rotating steel ring was at a mandrel speed of about 800 r.p.m. Pressures between the ring and the test block were regulated by applying a load to the calibrated lever arm. Table II sets forth two numbers for the results of the Timken Test. The first number denotes the pound weight at which the grease passed the test; and the second number denotes the pounds weight at failure.

The Mean Hertz load test values were obtained by placing the test grease in a 4-ball test machine and determining the pressure at which welding took place. The Mean Hertz load figures denote the weight in kilograms at which welding of the 4 balls occured.

The Almen Test is described in "Lubricants and Lubrication" by Clower, published by the McGraw-Hill Book Company in 1939, pages 145 to 148 inclusive. The Falex Table III hereinbelow presents data showing that it is essential to have at least 0.5%, by weight, of water to prepare a high film strength grease according to this invention. A grease composition was prepared as in Example I hereinabove having a final water content of 0.8%. This grease composition was then heated for one hour at 490–500° F. at an absolute pressure of about 10 mm. of Hg to remove water therefrom. The final water content was less than 0.01%, by weight. The comparative grease characteristics were as follows:

Table III

| | Before dehydration | After dehydration |
|---|---|---|
| $P_0$ | 295 | 303 |
| $P_{60}$ | 330 | 331 |
| Timken, pounds (pass/fail) | 65/70 | —/25 |

Whereas the original grease passed the Timken Test at 65 pounds, the dehydrated grease failed the Timken Test at 25 pounds.

In the preparation of the greases as described herein, by increasing the temperature of the mixture to temperatures as high as 470° F. it is possible to improve the yield of the grease thickening agents. The data set forth in Table IV hereinbelow show that manufacturing temperatures as high as and no greater than 470° F. markedly enhance the thickening effect of the grease thickening agents.

Table IV

| | (a) | (b) |
|---|---|---|
| Components used in grease preparation, weight percent: | | |
| (1) Methyl 12-OH stearate | 8.3 | 7.50 |
| (2) Glacial acetic acid | 4.9 | 4.40 |
| (3) Hydrated lime | 12.4 | 11.10 |
| (4) Sodium hydroxide | 0.1 | 0.10 |
| (5) Urea | 3.3 | 2.95 |
| (6) Base oil | 67.7 | 70.85 |
| (7) Rust inhibitor | 2.0 | 1.80 |
| (8) Oxidation inhibitor | 0.3 | 0.30 |
| (9) Zinc oxide | 1.0 | 1.00 |
| Maximum processing temperature, °F | 320 | 430 |
| Percent thickener | 26 | 23 |
| Grease properties—ASTM Penetration: | | |
| $P_0$ | 280 | 300 |
| $P_{60}$ | 335 | 338 |
| Dropping point, °F | 530 | 520 |

In addition to the base oils, the calcium 12-hydroxy stearate, calcium acetate, calcium carbonate, calcium hydroxide and water, the grease compositions of this invention may include stringiness agents, oxidation inhibitors, anti-wear agents, fillers, anti-thixotropic agents, etc.

I claim:

1. A multi-purpose hydrous grease composition containing a major proportion of an oil of lubricating viscosity, from 5% to 25% by weight of calcium 12-hydroxy stearate, from 4% to 25% by weight, of calcium acetate, excess alkalinity in amount of about 1.0% to about 8.0% by weight expressed as calcium hydroxide, from 1.7% to about 10.0% by weight of calcium carbonate, and from 0.5% to 3% by weight, of water, and wherein the mol ratio of said acetate to said stearate is from 2:1 to 5:1.

2. A multi-purpose hydrous grease composition containing a major proportion of an oil of lubricating viscosity, from 7% to 12% by weight of calcium 12-hydroxy stearate, from 4% to 25% by weight, of calcium acetate, excess alkalinity in amount of about 1.0% to about 8.0% by weight expressed as calcium hydroxide, from 1.7% to about 10.0% by weight of calcium carbonate, and from 0.5 to 3% by weight of water, wherein the mol ratio of said calcium acetate to said calcium 12-hydroxy stearate has a value from 2 to 5.

3. A multi-purpose hydrous grease composition consisting essentially of a major proportion of an oil of lubricating viscosity, from 7% to 12% by weight of calcium 12-hydroxy stearate, from 6% to 12% by weight of calcium acetate, from about 1.0% to about 8.0% by weight of calcium hydroxide, from 1.7% to about 10.0% by weight of calcium carbonate, and from 0.5 to 3% by weight of water, wherein said calcium acetate is present in an amount of from 2 mols to 5 mols per mol of calcium 12-hydroxy stearate.

4. A multi-purpose hydrous grease composition consisting essentially of a major proportion of an oil of lubricating viscosity, from 7% to 12% by weight of calcium 12-hydroxy stearate, from 6% to 12% by weight, of calcium acetate, from about 1.0% to about 8.0% by weight of calcium hydroxide, from 2.0% to about 6% by weight of calcium carbonate, and from 0.5 to 3% by weight of water, wherein said calcium acetate is present in an amount of about 2 mols to 5 mols per mol of calcium 12-hydroxy stearate.

5. A multi-purpose hydrous grease composition comprising a major proportion of an oil of lubricating viscosity, from about 7.0% to about 12.0% by weight of calcium 12-hydroxy stearate, from 6.0% to about 12.0% by weight of calcium acetate, from 2.0% to about 6.0% by weight of calcium carbonate, from 1.0% to 8.0% by weight of calcium hydroxide, 0.5 to 3% water, wherein the mol ratio of said calcium acetate to said calcium 12-hydroxy stearate has a value from 2 to 5, and said calcium carbonate is derived from the reaction of urea with calcium hydroxide.

6. A multi-purpose hydrous grease composition having extreme pressure characteristics consisting essentially of a major proportion of a mineral lubricating oil, from about 7.0% to about 12.0% by weight of calcium 12-hydroxy stearate, from 6.0% to about 12.0% by weight of calcium acetate, from 2.0% to about 6.0% by weight of calcium carbonate, from 1.0% to 8.0% by weight of calcium hydroxide, from 0.5% to 3.0% water, wherein the mol ratio of said calcium acetate to said calcium 12-hydroxy stearate has a value from 2 to 5, and said calcium carbonate is derived from the reaction of urea with calcium hydroxide.

7. A multi-purpose grease composition containing a major proportion of an oil of lubricating viscosity, from 5% to 25% by weight of calcium 12-hydroxy stearate, from % to 25% by weight, of calcium acetate, excess alkalinity in amount of about 1.0% to about 8.0% by weight expressed as calcium hydroxide, from 1.7% to about 10.0% by weight of calcium carbonate and from 0.1% to 3% by weight, of water, and wherein the mol ratio of said acetate to said stearate is from 2:1 to 5:1, wherein said grease was prepared by heating to a maximum temperature up to about 470° F.

8. A multi-purpose grease composition containing a major proportion of an oil of lubricating viscosity, from 7% to 12% by weight of calcium 12-hydroxy stearate, from 4% to 25% by weight, of calcium acetate, excess alkalinity in amount of about 1.0% to about 8.0% by weight expressed as calcium hydroxide, from 1.7% to about 10.0% by weight of calcium carbonate, and from 0.1 to 3% by weight of water, wherein the mol ratio of said calcium acetate to said calcium 12-hydroxy stearate has a value from 2 to 5, wherein said grease was prepared by heating to a maximum temperature up to about 470° F.

9. A multi-purpose grease composition containing a major proportion of an oil of lubricating viscosity, from 5% to 25% by weight of calcium 12-hydroxy stearate, from 4% to 25% by weight, of calcium acetate, excess alkalinity in amount of about 1.0% to about 8.0% by weight expressed as calcium hydroxide, from 1.7% to about 10.0% by weight of calcium carbonate, and from 0.1% to 3% by weight, of water, and wherein the mol ratio of said acetate to said stearate is from 2:1 to 5:1, wherein said grease was prepared by heating to a maximum temperature of 320° F. to about 470° F.

References Cited by the Examiner

UNITED STATES PATENTS

| | | | |
|---|---|---|---|
| 2,417,428 | 3/47 | McLennan | 252—39 |
| 2,417,431 | 3/47 | McLennan | 252—39 |
| 2,595,556 | 5/52 | Worth et al. | 252—40.7 |
| 2,883,342 | 4/59 | Sproule et al. | 252—42.1 |

DANIEL E. WYMAN, *Primary Examiner.*